US012625898B2

(12) United States Patent
Zaman et al.

(10) Patent No.: US 12,625,898 B2
(45) Date of Patent: May 12, 2026

(54) SYSTEM AND METHODS FOR OPTIMIZING DOCUMENT STORAGE COST

(71) Applicant: Kyocera Document Solutions Inc., Osaka (JP)

(72) Inventors: Selim Zaman, San Mateo, CA (US); Chikara Yuki, Walnut Creek, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 18/808,508

(22) Filed: Aug. 19, 2024

(65) Prior Publication Data

US 2026/0050624 A1    Feb. 19, 2026

(51) Int. Cl.
| | |
|---|---|
| *G06F 17/00* | (2019.01) |
| *G06F 7/00* | (2006.01) |
| *G06F 16/185* | (2019.01) |
| *G06F 16/35* | (2019.01) |
| *G06F 16/383* | (2019.01) |

(52) U.S. Cl.
CPC ............ *G06F 16/35* (2019.01); *G06F 16/185* (2019.01); *G06F 16/383* (2019.01)

(58) Field of Classification Search
CPC ....... G06F 16/35; G06F 16/383; G06F 16/185
USPC ........................................................ 707/694
See application file for complete search history.

(56) References Cited

U.S. PATENT DOCUMENTS

| | | | | | |
|---|---|---|---|---|---|
| 8,843,459 | B1 * | 9/2014 | Aston | ................... | G06F 3/0643 |
| | | | | | 709/224 |
| 9,367,557 | B1 * | 6/2016 | Lin | ...................... | G06F 16/1744 |
| 10,901,943 | B1 * | 1/2021 | Bent | ...................... | G06F 3/0685 |
| 2006/0041719 | A1 * | 2/2006 | Chui | ........................ | G06F 16/10 |
| | | | | | 711/E12.019 |
| 2006/0236056 | A1 * | 10/2006 | Nagata | .................... | G06F 3/061 |
| | | | | | 711/165 |
| 2011/0051193 | A1 | 3/2011 | Okabe | | |
| 2018/0232395 | A1 * | 8/2018 | Deshmukh | ............ | G06F 3/0643 |
| 2019/0258419 | A1 * | 8/2019 | Carey | ................... | G06F 3/0685 |
| 2020/0167360 | A1 * | 5/2020 | Rath | ..................... | G06F 16/278 |
| 2020/0372002 | A1 * | 11/2020 | Cronan | ................... | G06F 16/13 |
| 2021/0132800 | A1 * | 5/2021 | Papandreou | ........ | G06F 11/3495 |
| 2021/0141698 | A1 * | 5/2021 | Bourgeois | ............ | G06F 16/353 |

* cited by examiner

*Primary Examiner* — Pavan Mamillapalli
(74) *Attorney, Agent, or Firm* — Millen, White, Zelano & Branigan P.C.; William F. Nixon

(57) ABSTRACT

A document management method for optimizing storage costs of new importing documents and existing documents are disclosed. The method categorizes the uploaded documents and the existing documents based on metadata and attributes embedded therein and saves the uploaded documents and the existing documents in a cold storage or a hot storage based on their usage or access metrics calculated from the attributes. A document management system that managing storages of new uploaded documents and the existing documents using the above method is also disclosed.

17 Claims, 4 Drawing Sheets

SYSTEM AND METHODS FOR OPTIMIZING DOCUMENT STORAGE COST

FIELD OF THE INVENTION

The present invention relates to a system and method for managing and organizing uploaded documents and existing documents. In particular, the present invention relates to a system and method for uploading bulk documents to a new document management system and re-organizing existing documents saved in the new document management system to optimize their storage cost.

Description of the Related Art

When a new customer merges their document management system into a new system, the customer usually needs to import documents in bulk into this new system. Currently, after the documents are uploaded, the customer has to manually organize their folder structures so that the uploaded documents can be saved in their specific folders. Storing the documents could be costly. To reduce the cost, the customer may reorganize the documents by placing less frequently accessed documents into a cold storage, and more frequently accessed documents into a hot storage. This method also involves manually switching documents between the hot and cold storages.

Currently, there are no document managing system and method that can automatically classify the documents for storage cost optimized purposes.

SUMMARY OF THE INVENTION

A computer-implemented method for managing storage costs of documents is disclosed. The method analyzes metadata embedded in a plurality of documents that are newly migrated into a new document management system, wherein the metadata is used for categorizing the plurality of documents. The method also analyzes attributes embedded in each document of the plurality of documents, wherein the attributes include usage metrics for each document of the plurality of documents, and storing the plurality of documents to specific storages including hot storages and cold storages based on the metadata and the at least one attribute. In the above method, the usage metrics of usage of the plurality of document includes a frequency of access, a priority, a class, and a retention state.

The above method also analyzes the attributes embedded in the plurality of documents after being stored in the specific storages and determining if storage statuses of the plurality of existing documents needs to be changed. The analyzing step is performed periodically or by demand.

Further, the above method determines usage patterns or document usage characteristics of the plurality of documents based on the attributes, and routes the plurality of documents to different storages if the usage patterns change over a predetermined threshold level. The predetermined threshold level could be a seasonality of a document, a frequency of the document being accessed, or a retention state of the document.

In the above method, the document usage characteristics include a measured number of times each of the plurality of document is accessed, a measured number of users who access each of the plurality of document, priorities of the plurality of documents, and characteristics retained in the plurality of documents.

A computer-implemented method for organizing documents is further disclosed. The method analyzes metadata embedded in each document of a plurality of documents saved in a document management system, wherein metadata is used for categorizing the plurality of documents, and analyzes attributes embedded in each document of the plurality of documents, wherein the attributes include usage metrics for each of the plurality of documents. The method further stores the plurality of documents to specific storages including hot storages and cold storages based on the metadata and the attributes, analyzing the attributes periodically or on-demand to determine if at least one of the attributes changes over a predetermined threshold level, and re-routing the plurality of documents if any of the attributes changes over the predetermined threshold level. In the method, the usage metrics of usage of the plurality of document includes a frequency of access, a priority, a class, and a retention state The above method further determines usage patterns of the plurality of documents based on the attributes, and routing the plurality of documents to different storages if the usage patterns change over the predetermined threshold level. The predetermined threshold level may include a seasonality of a document, a frequency of the document being accessed, or a retention state of the document.

The method also determines document usage characteristics of each of the plurality of documents and routing the plurality of documents to different storages based on their usage characteristics. The document usage characteristics include a measured number of times each of the plurality of document is accessed, a measured number of users who access each of the plurality of document, priorities of the plurality of documents, and characteristics retained in the plurality of documents.

A document management system for organizing storage of uploaded documents and existing documents saved in the system is also disclosed. The document management system includes more than one storage including hot storages and cold storages, a database for storing medium-readable instructions, a managing device, comprising a processor, wherein the medium-readable instructions stored in the database, when executed, causes the processor to analyze metadata embedded in each of the uploaded documents and the existing documents, wherein the metadata is used for categorizing the plurality of documents, analyze attributes embedded in each of the uploaded documents and the existing documents, wherein the at least one attribute includes usage metrics for each of the uploaded documents and the existing documents, store the uploaded documents and the existing documents to the hot storages and the cold storages based on the metadata and the attributes, analyze the attributes periodically or on-demand to determine if any of the attributes changes over a predetermined threshold level, and re-route the uploaded documents and the existing documents if any of the attributes changes over the predetermined threshold level.

In the above system, the predetermined threshold level is a seasonality of a document, a frequency of the document being accessed, or a retention state of the document. The usage metrics of usage of the plurality of document includes a frequency of access, a priority, a class, and a retention state.

In the above document management system, the processor is further configured to determine document usage characteristics of each of the plurality of documents and routing the plurality of documents to different storages based on their usage characteristics. the document usage characteristics include measured number of times each of the plurality of document is accessed, measured number of users who access each of the plurality of document, priorities of the plurality of documents, and characteristics retained in the plurality of documents.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1:
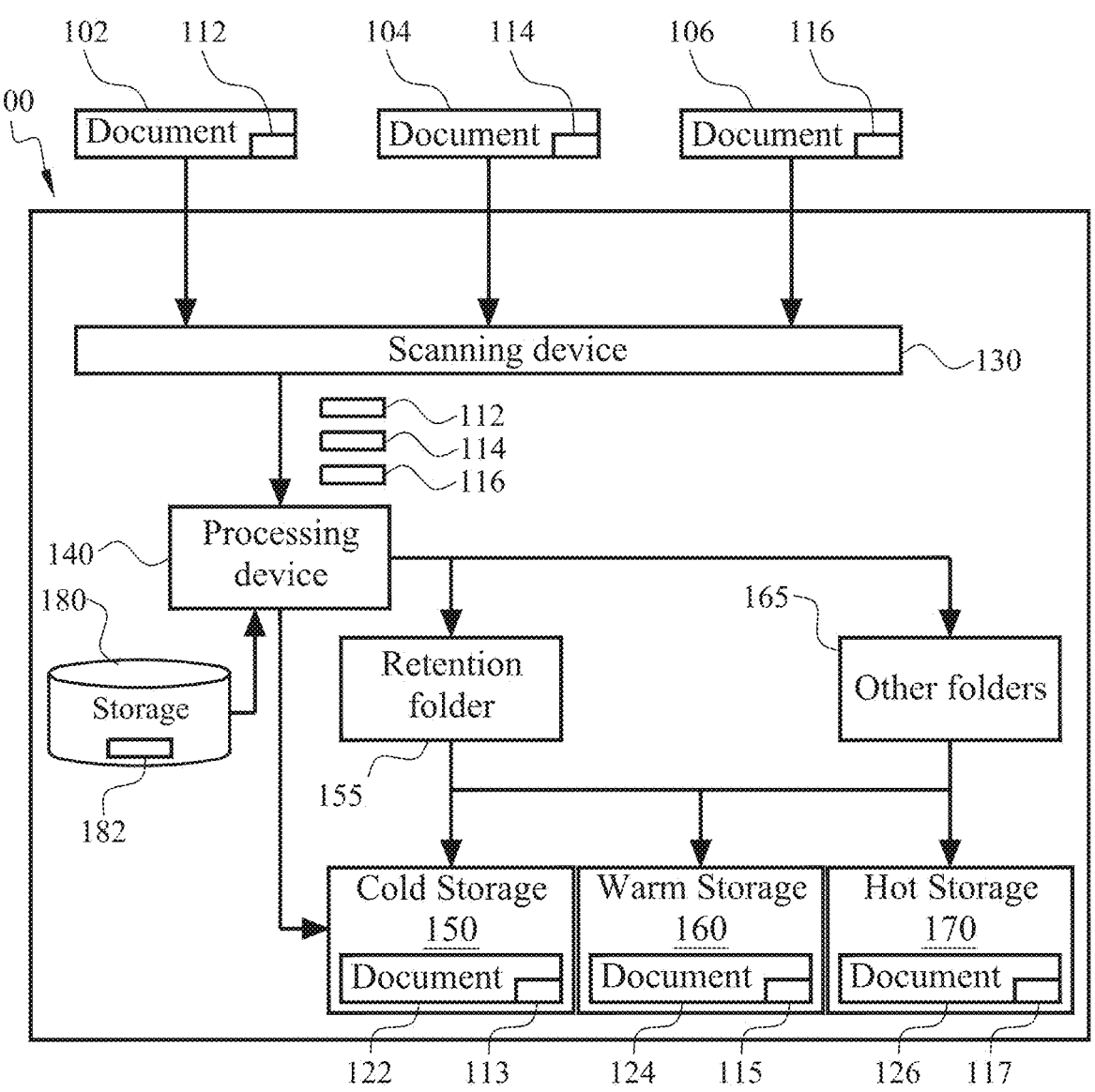
FIG. 1 depicts a block diagram of a document management system according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments aim to classify documents based on metadata embedded therein to automatically place the documents in a cold storage or a hot storage according to information included in the metadata. Normally, some documents are frequently accessed and some are not. To place the documents that are frequently accessed in a hot storage and the documents that are less frequently accessed in a warm or a cold storage will reduce a total storage cost of the documents as the cost for saving documents in the hot storage is far more expensive than the warm or cold storages. Conventionally, saving the documents in the hot storage, warm, and the cold storages is manually organized by an administrator based on their access frequencies, which is inefficient and time-consuming. Therefore, the document management systems and methods in accordance with the disclosed embodiments solve the problems by automatically saving frequently-accessed documents to the hot storage and less-frequently-accessed documents to the warm or the cold storages during an importing process of new documents. The systems and method in accordance with the disclosed embodiments may further automatically re-organizing existing saved documents by moving the documents to either one of the hot storage, the warm storage, and the cold storage based on their access frequency.

In the disclosed embodiments, the determination of saving a document in a hot, warm, or cold storage is based on metadata embedded therein. Metadata are created for every electronic document to define information regarding the document, but not the contents of the document. Metadata means "data about data", which is used to summarize basic information about the document that can make tracking and working with specific data easier. Some examples of the data include means of creation of the document, purpose of the document, time and date of creation of the document, creator or author of the document, location on a computer network where the document was created, standard used, file size, data quality, source of the document, and so on. Metadata may include attributes for recording data about who accesses the document, how many times the document has been accessed, classification of the document, and so on. In accordance with the disclosed embodiments, the number of accessed time and the classification of the document are main factors used to determine where the document is to be stored to. Further, some information saved in the metadata of every document are variable. For example, the information regarding who accessed the document, the number of access of the document, changes of the document, the date and the time when the document was accessed will change after every access. Therefore, by detecting the above information saved in the metadata of the document, the disclosed embodiments can automatically classify and categorize the document and save the document to a proper storage.

The disclosed embodiments are particularly beneficial to process bulk documents imported by a new client from a legacy document management system. The location where each of the bulk documents should be saved can be determined during the importing process. With the similar manner, the disclosed embodiments may also automatically re-arrange the storages of the existing documents saved in the document management system based on the information read from the metadata of the documents so as to optimize the total storage cost.

FIG. 1 illustrates a schematic diagram of a document management system 100 in accordance with the disclosed embodiments. The disclosed embodiments can be used not only to manage the storage of new documents uploaded from a new customer or user during a document importing process, but also to manage existing documents that have already been saved in system 100. In FIG. 1, a plurality of documents, such as documents 102, 104, and 106, are uploaded to system 100 and a plurality of existing documents, such as documents 122, 124, and 126, are saved in hot storage 150, warm storage 160, and cold storage 170. Documents 102, 104, and 106 may be new documents uploaded from a new customer transferred from a legacy document management system to system 100. Documents 102, 104, and 106 may also be new documents uploaded from an existing customer. Documents 122, 124, and 126 are documents previously uploaded and saved documents from the existing customer. Documents 122, 124, and 126 are saved in cold storage 150, warm storage 160, and hot storage 170 based on metadata 113, 115, and 117 detected when they are uploaded into system 100. Each of cold storage 150, warm storage 160, and hot storage 170 stores a plurality of documents, but only one document, such as 122, 124, and 126 are shown in the figure for an exemplary purpose. As described above, some information saved in the metadata of the documents will change after the documents are accessed. Therefore, to optimize the storage cost, the system and method in accordance with the disclosed embodiments may periodically, or by demand, analyze metadata 113, 115, and 117 of saved documents 122, 124, and 126 to determine whether these documents should be saved to a different storage.

Document management system 100 of the disclosed embodiment includes a scanning device 130, a processing device 140, cold storage 150, warm storage 160, and hot storage 170. In addition, system 100 includes a retention folder 155, and other category folders 165 for storing uploaded documents 102, 104, and 106 based on their categories and metadata. Documents 102, 104, and 106 may be electronic documents, each of is embedded metadata 112, 114, and 116 when it is generated. Metadata 112, 114, and 116 may include information regarding titles, classes, dates, authors, attributes, keywords, etc. of documents 102, 104, and 106.

A storage 180 is also included in system 100 that stores medium-readable instructions 182. Instructions 182, when executed, causes processing device 140 to perform specific functions, such as analyzing the metadata, categorizing documents 102, 104, and 106 based on the analyzing result, determining a folder among folders 155 and 165 based on attributes in metadata 112, 114, and 116 to save documents 102, 104, and 106 to retention folder 155 or other category folder 165.

Figure 2:
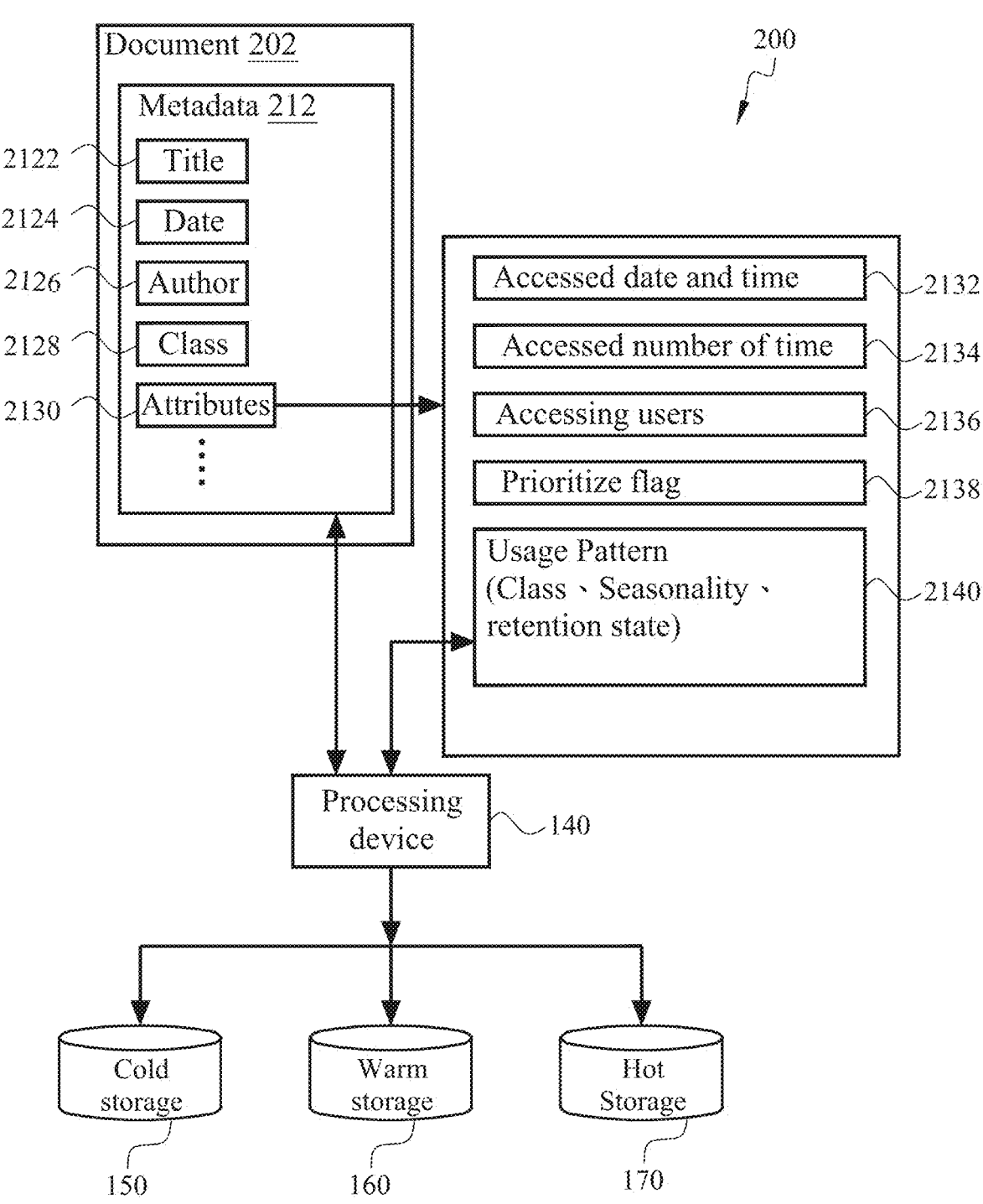
FIG. 2 depicts a block diagram of a processing module within a document management system in accordance with the disclosed embodiments that illustrates the storage determination of uploaded documents or existing documents saved in system.

An example of metadata can be found in FIG. 2. As shown, metadata 212 of a exemplary document 202 may include data representing a title 2122, creation date 2124, author 2126, class 2128, attributes 2130, etc., of document 202. Examples of attributes 2130 may include "accessed date and time" attribute 2132, "accessed number of time" attribute 2134, "accessing users" attribute 2136, "prioritized flag" attribute 2138, and "usage pattern" attribute 2140 and so on. "Usage pattern" attribute 2140 defines that document 202 is only for seasonality use or is under retention. A seasonality-use document means that the document will only be accessed for a particular reason or seasonally. For example, the document could be a tax-related document that will only be accessed during the tax seasons. A document under intention is a document that has not been accessed for a long time. Such documents may include invoices issued more than one year ago, and haven't been accessed ever since, an old company directory generated five years ago, or documents that are not accessed in regular basis.

In general, attributes 2132-2140 are data regarding usage (access) metrics of document 202. Based on the usage metrics, the disclosed embodiments are able to optimize the storage cost by storing documents that are less-frequently accessed in a lower cost storage service in the cloud, and by storing documents that are in frequent use in a higher cost, fast retrieval storage service. More details of attributes 2130 will be further described below in FIG. 2.

Back to FIG. 1, scanning device 120 may be a scanner for scanning documents 102, 104, and 106, and for detecting metadata 112, 114, and 116 of documents 102, 104, and 106. In some embodiments, scanning device 120 may be an OCR (Optical Character Recognition) device that scans and performs an OCR operation on documents 102, 104, and 106. In addition to perform the OCR operation on the documents, the OCR device may further detect metadata embedded in the documents or embeds metadata on the documents based on contents or keywords contained in the documents.

Metadata 112, 114, and 116 after detected by scanning device 120 are sent to processing device 140 for processing. Processing device 140 is capable of analyzing metadata 112, 114, and 116 of documents 102, 104, and 106 and categorizing documents 102, 104, and 106 based on their metadata. Processing device 140 also is capable of determining a proper folder to place documents 102, 104, and 105 by analyzing the attributes of metadata 112, 114, and 116. For example, if attributes 1140 of document 102 shows that document 102 is under retention, i.e., document 102 has not been accessed for a predetermined period of time, documents 102 will be placed in retention folder 155. Other documents that are not under retention (by analyzing attribute 2140) will be placed in other folders 165.

Analyzing and categorizing documents 102, 104, and 106 can be done in a pre-processing stage of the importing process. As there will be a bulk of documents uploaded into system 100 during the importing process, the pre-processing stage preliminarily places uploaded documents in folder 155 and 165 simply based on their metadata embedded therein so that the total processing time of the uploaded bulk documents can be reduced.

After all of the importing documents are uploaded and saved in folders 155 and 165, processing device 140 next stores the uploaded documents in cold storage 150, warm storage 160, and hot storage 170 based on the usage metrics of each of the imported documents. In this regard, processing device 140 determines the usage metrics of each of the imported documents by analyzing attributes 2132-2140. The usage metrics may include an accessed frequency calculated by the dates and times that the document has been accessed indicated in attribute 2132 and the number of times that the document has been accessed indicated in attribute 2134. The usage metrics may also include a priority level of a document indicated by attribute 2138, the accessing users indicated by attribute 2136, and the usage pattern indicated by attribute 2140. If a first document has not been accessed in more than a first predetermined period of time, e.g., six months, the first document will be saved in cold storage 155 that has a lowest storage cost and a least storage service. If a second document has been accessed within the first predetermined period of time but not have been accessed within a second predetermined period of time, e.g., three months, the second document will be saved in warm storage 160 with a storage cost higher than that of cold storage 150. Finally, if a third document has been accessed within the second predetermined period of time, the third document will be stored in hot storage 170 that has a highest storage cost and a best storage service. In various embodiments, the determination of storing documents 102, 104, and 106 in cold storage 150, warm storage 160, and hot storage 170 is based on their accessed frequency within a certain period of time, whether they are prioritized or not, or if they are only for seasonality use. For example, cold storage 150 may stores documents that are for seasonality use or not prioritized or under retention, warm storage 160 store documents of which the accessed frequency within the certain period of time is less than a threshold value, and hot storage 170 stores document with the accessed frequency more than the threshold value. Which types of documents to be saved in storage 150, 160, and 170 are predetermined by system 100 or an administration user based on a budget or the user's document classification, and the disclosed embodiment are not limited with this regard.

Normally, cold storage 150 is located in a remote place from system 100, such in a cloud, that provides least storage services and is not retrievable immediately. Therefore, the storage cost for cold storage 150 is lowest and documents that are under retention are usually saved in cold storage 155 to save their storage cost. Warm storage 160 provides a slightly faster retrieval storage service than cold storage 150, which may also be located in the cloud and it storage cost is higher than cold storage 150. Hot storage 170, on the other hand, is most costly, but provides a fastest retrieval storage service. Hot storage 170 may be located locally and documents stored in hot storage 170 is retrievable when needed.

Therefore, documents that are needed frequently or daily will be stored in hot storage 170. As storing documents in warm storage 160 or hot storage 170 can be costly, the disclosed embodiments provides a processing module that automatically saves less-frequently accessed documents into cold storage 150 so that the storage cost can be reduced greatly. Further, the disclosed embodiments include, hot, warm, and cold storages to save the documents. Various embodiments may include only hot and cold storages for saving frequently-accessed document (accessed within 3 months, for instance) in the hot storage and the rest of the documents in the cold storage.

Processing device 140 in accordance with the disclosed embodiments may also analyze metadata 113, 115, and 117 embedded in existing documents 122, 124, and 126 that are saved in storages 150, 160, and 170, respectively, to determine whether these documents should be moved to a different storage. Similar to processing documents 102, 104, and 106, processing device 140 determines the statuses of documents 122, 124, and 126 by analyzing attributes 2130 of their embedded metadata 113, 115, and 117. For example, attributes 2130 of document 122 saved in cold storage 150 shows that document 122 has been accessed within six months but not within three months, processing device 140 may move document 122 from cold storage 150 and save it to warm storage 160. If attributes 2130 of document 124 saved in warm storage 160 shows that document 124 has not been accessed more than six months, processing device 140 may move document 124 from warm storage 160 to cold storage 150. In the same manner, if attributes 2130 of document 126 shows that documents 126 are accessed in the past three months, processing device 140 will maintain document 126 in hot storage 170.

FIG. 2 described below will further explain a processing module for organizing storing documents imported to system 100 and the documents that have been saved in system 100 in accordance with the disclosed embodiments.

FIG. 2 depicts a block diagram of a processing module 200 within document management system 100 to further illustrate the storage determination of uploaded documents or existing documents saved in system 100.

Processing module 200 includes processing device 140 of FIG. 1. The uploaded documents include documents 102, 104, and 106 and the existing documents includes documents 122, 124, and 126 shown in FIG. 1. For brevity, only document 202 is shown in FIG. 2. It is noted that document 202 here not only represents new uploaded documents 102, 104, and 106, but also represents existing documents 122, 124, and 126 of FIG. 1. Further, same devices as in FIG. 1 are marked with the same reference numbers in FIG. 2 for brevity. Moreover, process module 200 is not only used to categorize and store newly imported documents, but also to re-organize existing documents that have already been stored in hot, warm, or cold storages 170, 160, and 150.

Categorizing and storing documents 102, 104, 106 and 122, 124, 126 are based on their embedded metadata 112, 114, 116 and 113, 115, 117. As described above, processing device 140 analyzes metadata 212 of document 202, especially attributes 2130, to determine the statuses of document 202. For example, processing device 140 determines if document 202 is a prioritized document based on prioritized flag attributes 2138, if document 202 is a seasonality-used document based on usage pattern attributes 2140, who have accessed document 202 based on accessing user attributes 2136, the number of time that document 202 have been accessed based on accessed number of time attribute 2134, and the dates and time that document 202 was accessed based on accessed data and time attribute 2132. Based on the statues of document 202, processing device 140 determines which storage of storages 150, 160, and 170 document 202 should be stored to.

For example, if document 202 is a prioritized document, document 202 may be stored in hot storage 170, and if document 202 is a seasonal document, document 202 may be stored in warm storage 160. Further, if document 202 has not been accessed for a first predetermined period of time, for example, six months, document 202 may be considered least-frequently accessed. In this case, document 202 may be stored in cold storage 150. However, if document 202 has been accessed in the past six months, processing device 140 further checks if document has been accessed in a second predetermined period of time, for example, three months. If it has been accessed in the past three months, document 202 may be stored in hot storage 170. Otherwise, document 202 is not considered as "hot," and it may be stored in warm storage 160. The first predetermined period of time and the second predetermined period of time are preset by an administer user or preset by system 100, and are not limited to six months or three months.

In accordance with the disclosed embodiments, after documents 102, 104, 106, 122, 124, and 126 are saved in their storages, system 100 may periodically, or by demand, update re-organization of the saved documents. When an update process is scheduled to perform, a user or an administrator may be notified by a pop-up message or emails asking for permission for update. Once the update process starts, the disclosed embodiments analyze the metadata and attributes of the saved documents by moving less-frequently accessed documents into the cold or warm storages and more-frequently accessed documents into the hot storage. As the attributes contained in the metadata of the documents vary according to their usage, by detecting the attributes, such as the last accessed date and time, the number of accesses within a period of time, etc., an accessing frequency of a document can thus be calculated. Therefore, by referring to the accessing frequency of the document, processing device 140 is able to determine which storage the document should be saved to. In accordance with the disclosed embodiments, re-organizing the storages of existing documents are done periodically, such as semi-annually. When a re-organization action of the document storage is due, system 100 may send out a reminding message to the administration user.

System 100 of FIG. 1 and processing module 200 of FIG. 2 both show that the documents are saved in hot storage 170, warm storage 160, and cold storage 150. The number of storages, however, is not limited thereto. In various embodiments, system 100 may only include a hot storage and a cold storage. In this case, system 100 or processing module 200 may determine saving the documents to cold storage 150 and warm storage 170 by their accessed frequencies within a preset period of time or their priority levels.

Figure 3:
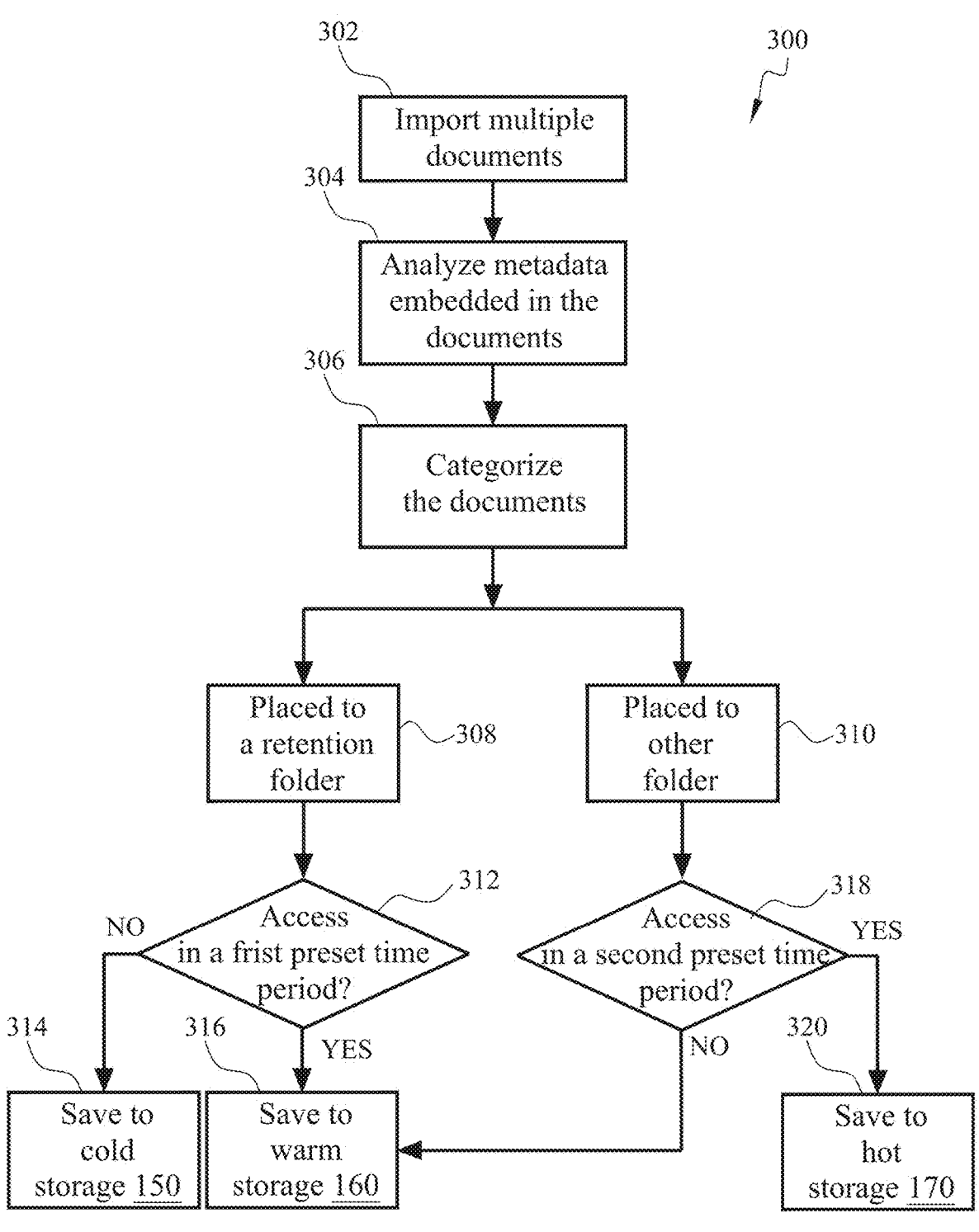
FIG. 3 depicts a process for managing the storage of multiple uploaded documents in accordance with the disclosed embodiments.

FIG. 3 depicts a process 300 for managing the storage of multiple uploaded documents in accordance with the disclosed embodiments. Process 300 may be used in a situation where t a new customer imports bulk documents from an old or legacy management system to document management system 100 of the disclosed embodiments, or a situation where an existing client uploads new documents into system 100.

Step 302 executes by importing documents in bulk into system 100 of FIG. 1 of the disclosed embodiments. As described in FIG. 1, scanner 130 first scans the documents to detect metadata, such as metadata 112, 114, and 116 of documents 102, 104, and 106.

Step 304 executes by analyzing the document metadata and/or document classes, to determine categories of the documents. As shown in FIG. 2, metadata may include title, author, creation date, classes, attributes, and so one.

Next, step 306 executes by categorizing the documents based on the metadata analyzed at step 304.

Step 308 executed by saving documents with retention statuses in a retention folder, such as retention folder 155 of FIG. 1. Retention statuses are saved in usage pattern attributes 2140, representing that the documents have not been accessed for a long time. Such documents may include invoices issued more than one year ago, and haven't been accessed ever since, an old company directory generated five years ago, or documents that are not accessed in regular basis.

Step 310 executes by saving documents other than those with retention statuses to other folders based on their categories.

Next, step 312 executes by determining whether the documents saved in the retention folder have been accessed in a first predetermined period of time, such as within six months. The first predetermined period of time is not limited to six months, which could be any period of time depending on the choice of the administrator user.

If the answer for some documents at step 312 is "NO," which means these documents are "least-frequently accessed. Therefore, step 314 executes by storing these documents to cold storage 150.

However, if the answer for other documents at step 312 is "Yes," step 316 executes by storing such documents to warm storage 160.

Further, step 318 executes by determining whether documents saved in other folders has been accessed within a second predetermined period of time. Because the documents saved in the other folders are normally accessed more frequently than those saved in the retention folder, the second predetermined period of time should be shorter than the first predetermined period of time. One example of the second predetermined period of time is three months.

For some documents saved in other folders, if the answer at step 318 is YES, step 320 will executes by storing these documents to hot storage 170. Otherwise, i.e., the answer for other documents saved in other folders is NO, these other documents will be saved in warm storage 160, as in step 316.

At this point, organizing the uploaded documents in their proper storage is then completed.

Figure 4:
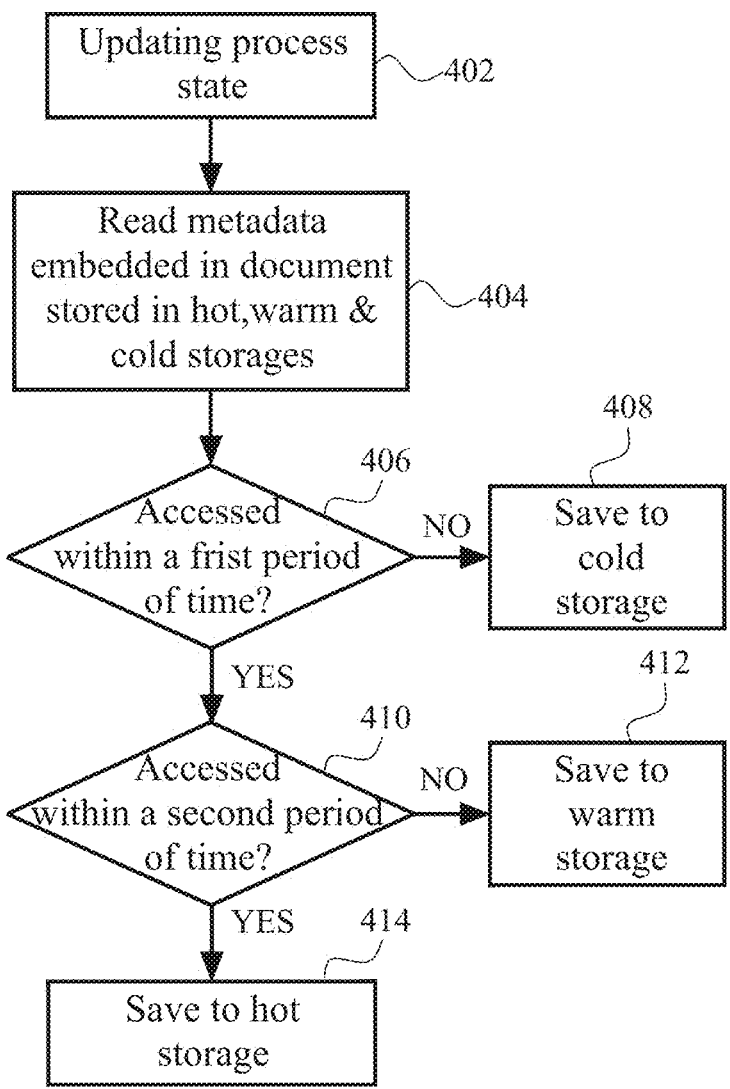
FIG. 4 depicts a process for reorganizing existing documents saved in the document management system in accordance with the disclosed embodiments.

FIG. 4 depicts a process 400 for reorganizing existing documents saved in the document management system in accordance with the disclosed embodiments. As described above, to optimize the storage cost, system 100 may periodically or by demand reorganize the existing documents stored in the cold, warm, and hot storages based on the attributes contained in the metadata of the existing documents. System 100 may also send a reminding message through a pop-up message, or a text, or an email to the administrator uses when the due date for reorganization or updating the document storages is approaching.

Step 402 executes by starting the updating/reorganizing process.

Step 404 executes by detecting and analyzing metadata embedded in the existing documents stored in cold storage 150, warm storage 165, and hot storage 175. In this step, process 400 mainly analyzes attributes 2132-2140 of the metadata, as described in FIG. 2/

Step 406 executes that if the existing documents have been accessed within a first predetermined period of time, such as six months. If the answer is NO for a number of first documents, these first documents will be considered as "least-frequently accessed." Therefore, these first documents will be saved in cold storage 150. Saving these first documents into cold storage 150 may means some of the first documents are moved out from warm storage 160 or hot storage 170 to be saved in cold storage 150, or stays where they are if they were saved in cold storage 150 before the update process started.

If the answer for a number of second documents at step 406 is "YES", meaning the second documents are not least-frequently accessed documents, and they will be not stored in cold storage 150. Therefore, step 410 further executes by determining whether the second documents have been accessed within a second predetermined period of time. As stated before, the second predetermined period of time should be shorter than the first predetermined period of time and an example thereof is three months.

If a number of third documents among the second documents have not been accessed within the second predetermined period of time, i.e., NO at step 410, these third documents will be saved to warm storage 160, as shown at step 412.

As to those that has been accessed within the second predetermined period of time at step 410, i.e., Yes, step 414 will executes by saving those documents to hot storage 414.

After step 414, the updating/organizing process for the existing documents is completed.

The systems and methods in accordance with the disclosed embodiments automatically manage the storages of new uploaded documents and existing documents based on metadata embedded there in, in particularly, based on attributes that records information regarding usage or access metrics of the documents. The usage metrics of a document are determined based on the number of times the document is accessed, the number of users who access the document, the dates and times when the document are accessed, a prioritized flag based on the document class and seasonality, the usage pattern of the document, etc. According to the determined usage metrics of each of the documents, the disclosed embodiments are capable of reorganizing the documents to save less-frequently accessed documents in a lower-cost storage, such as cold storage 150, and to save frequently accessed documents in a higher-cost storage, such as warm storage 160 or hot storage 170 so that the storage cost can be optimized.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A computer-implemented method for managing storage costs of documents, the method comprising:
    analyzing metadata embedded in a plurality of documents that are newly migrated into a new document management system, wherein the metadata is used for categorizing the plurality of documents;
    analyzing attributes embedded in each document of the plurality of documents, wherein the attributes include usage metrics for each document of the plurality of documents;
    saving plurality of documents with retention statuses in a retention folder;

saving plurality of documents other than those with retention statuses to other folders based on their categories;

determining whether the documents saved in the retention folder have been accessed in a first predetermined period of time;

determining whether documents saved in other folders have been accessed within a second predetermined period of time;

storing the plurality of documents to specific storages including hot storages, warm storages and cold storages based on the metadata and the at least one attribute; and wherein the usage metrics of usage of the plurality of documents includes a frequency of access, a priority, a class, and a retention state.

2. The computer-implemented method of claim 1, further comprising analyzing the attributes embedded in the plurality of documents after being stored in the specific storages and determining if storage statuses of the plurality of existing documents needs to be changed.

3. The computer-implemented method of claim 2, wherein the analyzing is performed periodically or by demand.

4. The computer-implemented method of claim 2, further comprising determining usage patterns of the plurality of documents based on the attributes, and routing the plurality of documents to different storages if the usage patterns change over a predetermined threshold level.

5. The computer-implemented method of claim 4, wherein the predetermined threshold level is a seasonality of a document, a frequency of the document being accessed, or a retention state of the document.

6. The computer-implemented method of claim 2, further comprising determining document usage characteristics of each document of the plurality of documents and routing the plurality of documents to different storages based on their usage characteristics.

7. The computer-implemented method of claim 6, wherein the document usage characteristics include a measured number of times each of the plurality of document is accessed, a measured number of users who access each of the plurality of document, priorities of the plurality of documents, and characteristics retained in the plurality of documents.

8. A computer-implemented method for organizing documents, the method comprising:

analyzing metadata embedded in each document of a plurality of documents saved in a document management system, wherein the metadata is used for categorizing the plurality of documents;

analyzing attributes embedded in each document of the plurality of documents, wherein the attributes include usage metrics for each of the plurality of documents;

saving plurality of documents with retention statuses in a retention folder;

saving plurality of documents other than those with retention statuses to other folders based on their categories;

determining whether the documents saved in the retention folder have been accessed in a first predetermined period of time;

determining whether documents saved in other folders have been accessed within a second predetermined period of time; and storing the plurality of documents to specific storages including hot storages, warm storages and cold storages based on the metadata and the attributes;

analyzing the attributes periodically or on-demand to determine if at least one of the attributes changes over a predetermined threshold level re-routing the plurality of documents if any of the attributes changes over the predetermined threshold level; and wherein the usage metrics of usage of the plurality of documents includes a frequency of access, a priority, a class, and a retention state.

9. The computer-implemented method of claim 8, further comprising determining probabilistic patterns of the plurality of documents based on the attributes, and routing the plurality of documents to different storages if the probabilistic usage patterns change over the predetermined threshold level.

10. The computer-implemented method of claim 8, wherein the predetermined threshold level is a seasonality of a document, a frequency of the document being accessed, or a retention state of the document.

11. The computer-implemented method of claim 8, further comprising determining document usage characteristics of each of the plurality of documents and routing the plurality of documents to different storages based on their usage characteristics.

12. The computer-implemented method of claim 11, wherein the document usage characteristics include a measured number of times that each of the plurality of document is accessed, a measured number of users who access each of the plurality of document, priorities of the plurality of documents, and characteristics retained in the plurality of documents.

13. The computer-implemented method of claim 8, wherein the analyzing and the rerouting steps are performed periodically or by demand.

14. The document management system of claim 8, wherein the processor is further configured to determine document usage characteristics of each of the uploaded documents and the existing documents and to save the uploaded documents and the existing documents to different storages based on their usage characteristics.

15. The document management system of claim 14, wherein the document usage characteristics include measured number of times each of the plurality of document is accessed, measured number of users who access each of the plurality of document, priorities of the plurality of documents, and characteristics retained in the plurality of documents.

16. A document management system for organizing uploaded documents and existing documents saved in the document management system, the document management system comprising:

at least three storages, including a hot storage, a warm storage and a cold storage;

a database for storing medium-readable instructions;

a managing device comprising a processor, wherein the medium-readable instructions stored in the database, when executed, causes the processor to:

analyze metadata embedded in each of the uploaded documents and the existing documents, wherein the metadata is used for categorizing the plurality of documents;

analyze attributes embedded in each of the uploaded documents and the existing documents, wherein the at least one attribute includes usage metrics for each of the uploaded documents and the existing documents;

save plurality of documents with retention statuses in a retention folder;

save plurality of documents other than those with retention statuses to other folders based on their categories;

determine whether the documents saved in the retention folder have been accessed in a first predetermined period of time;

determine whether documents saved in other folders have been accessed within a second predetermined period of time;

store the plurality of documents to the hot storages, the warm storages and the cold storages based on the metadata and the attributes;

analyze the attributes of each of the uploaded documents and the existing documents periodically or on-demand to determine if the attributes in any of the uploaded documents and the existing documents changes over a predetermined threshold level; and reorganize the storage of the uploaded documents and the existing documents if the attributes of any of the uploaded documents and the existing documents changes over the predetermined threshold level by moving the uploaded documents and existing documents to different storages; and wherein the usage metrics of usage of the plurality of document includes a frequency of access, a priority, a class, and a retention state.

17. The document management system of claim 16, wherein the predetermined threshold level is a seasonality of a document, a frequency of the document being accessed, or a retention state of the document.

\* \* \* \* \*